(12) United States Patent
Hummel et al.

(10) Patent No.: US 11,494,845 B1
(45) Date of Patent: Nov. 8, 2022

(54) SYSTEM AND METHOD FOR EMPLOYING A PREDICTIVE MODEL

(71) Applicant: Nationwide Mutual Insurance Company, Columbus, OH (US)

(72) Inventors: Kurt D. Hummel, Columbus, OH (US); David A. Moore, Westerville, OH (US); Jason A. Jump, Columbus, OH (US); Erin R. McClintock, Gahanna, OH (US); Shannon Terry, Upper Arlington, OH (US); Prashanti Ghale, Columbus, OH (US)

(73) Assignee: Nationwide Mutual Insurance Company, Columbus, OH (US)

( * ) Notice: Subject to any disclaimer, the term of this patent is extended or adjusted under 35 U.S.C. 154(b) by 191 days.

(21) Appl. No.: 15/490,965

(22) Filed: Apr. 19, 2017

Related U.S. Application Data

(60) Provisional application No. 62/381,702, filed on Aug. 31, 2016.

(51) Int. Cl.
*G06Q 40/08* (2012.01)
*G06N 20/00* (2019.01)

(52) U.S. Cl.
CPC ............ *G06Q 40/08* (2013.01); *G06N 20/00* (2019.01)

(58) Field of Classification Search
CPC .................................................... G06Q 40/08
(Continued)

(56) References Cited

U.S. PATENT DOCUMENTS

| 6,456,979 B1 * | 9/2002 | Flagg ..................... G06Q 40/08 705/2 |
| 8,243,719 B1 * | 8/2012 | Fillinger ............. H04M 3/5231 370/352 |

(Continued)

OTHER PUBLICATIONS

Legal and General America, "Appassist onboarding" Apr. 2016 (Year: 2016).*

(Continued)

*Primary Examiner* — Eric T Wong
*Assistant Examiner* — Claire A Rutiser
(74) *Attorney, Agent, or Firm* — Morgan, Lewis & Bockius LLP

(57) ABSTRACT

A predictive insurance underwriting system. An electronic life insurance policy application processing apparatus accepts data describing a consumer. An underwriting desktop processing apparatus receives the data. An underwriting rules processing apparatus determines, based on the data describing the consumer, whether the consumer is eligible for expedited underwriting of a life insurance policy covering the consumer. If it is determined that the consumer is eligible for expedited underwriting, a tele-interview processing apparatus collects first additional data relating to the consumer during a telephonic interview and, in response to a request from a processing unit, one or more third party databases transmit second additional data relating to the consumer. The processing unit is configured to: process the data collected via the electronic life insurance policy application, and the first additional data, using a predictive model that employs machine learning algorithms and generate a first score; process the second additional data to generate a mortality risk score; if the first score at least meets a first threshold score, and the mortality risk score meets at least a second threshold score, and at least certain business rules are met, generate data describing terms of a life insurance (Continued)

policy. A policy issuance system offers the terms of the life insurance policy to the consumer.

10 Claims, 13 Drawing Sheets

(58) Field of Classification Search
USPC .......................................................... 705/4
See application file for complete search history.

(56) References Cited

U.S. PATENT DOCUMENTS

| | | | |
|---|---|---|---|
| 2003/0187699 A1* | 10/2003 | Bonissone | G06Q 40/08 705/4 |
| 2004/0172310 A1* | 9/2004 | Atlee | G06F 17/243 705/4 |
| 2005/0182666 A1* | 8/2005 | Perry | G06Q 10/10 705/4 |
| 2009/0106054 A1* | 4/2009 | Sarel | G06Q 40/08 705/4 |
| 2011/0040582 A1* | 2/2011 | Mullins | G06Q 40/08 705/4 |
| 2011/0161100 A1* | 6/2011 | Peak | G06Q 40/08 705/2 |
| 2014/0229202 A1 | 8/2014 | Bogle et al. | |
| 2015/0039351 A1* | 2/2015 | Bell | G06Q 40/08 705/4 |
| 2016/0012542 A1* | 1/2016 | Steben | G06Q 40/08 705/4 |
| 2016/0078551 A1* | 3/2016 | Samuels | G06Q 40/08 705/4 |
| 2018/0342018 A1* | 11/2018 | Pancholi | G06Q 40/08 |
| 2019/0180379 A1* | 6/2019 | Nayak | G06Q 40/08 |

OTHER PUBLICATIONS

• Anonymous, "Systems and Methods for Medical Information Exchange for Underwriting Insurance Policies" An IP.com Prior Art Database Technical Disclosure; IP.com No. IPCOM000167022D; IP.com Electronic Publication Date: Jan. 29, 2008 (Year: 2008).*

* cited by examiner

SYSTEM AND METHOD FOR EMPLOYING A PREDICTIVE MODEL

CROSS REFERENCE TO RELATED APPLICATIONS

The application claims priority to U.S. Provisional Patent Application No. 62/381,702, filed Aug. 31, 2016, which is incorporated by reference herein in its entirety.

FIELD OF THE INVENTION

The invention relates to improved methods and systems for employing a predictive model.

BRIEF SUMMARY OF THE INVENTION

The invention is directed to a system and method for employing predictive modeling techniques. Data relating to a consumer is received at a computer processor. At least some of the data is collected via an electronic application. Based on the data, it is determined whether the consumer is eligible for expedited underwriting of a life insurance policy covering the consumer. If it is determined that the consumer is eligible for expedited underwriting of the life insurance policy, first additional data relating to the consumer is collected during a telephonic interview and second additional data relating to the consumer is collected from third party database sources. The data collected via the electronic application and the first additional data is processed using a predictive model that may employ machine learning algorithms and a first score is generated. The second additional data is processed to generate a mortality risk score. If the first score at least meets a first threshold score, and the mortality risk score meets at least a second threshold score, which threshold may vary based on the first score, and at least certain business rules are met, data describing terms of a life insurance policy is generated. The terms of the life insurance policy are offered to the consumer.

In connection with embodiments of the present invention, a predictive insurance underwriting system is employed. An electronic life insurance policy application processing apparatus accepts data describing a consumer. An underwriting desktop processing apparatus receives the data. An underwriting rules processing apparatus determines, based on the data describing the consumer, whether the consumer is eligible for expedited underwriting of a life insurance policy covering the consumer. If it is determined that the consumer is eligible for expedited underwriting, a tele-interview processing apparatus collects first additional data relating to the consumer during a telephonic interview and, in response to a request from a processing unit, one or more third party databases transmit second additional data relating to the consumer. The processing unit is configured to: process the data collected via the electronic life insurance policy application, and the first additional data, using a predictive model that may employ machine learning algorithms and generate a first score; process the second additional data to generate a mortality risk score; if the first score at least meets a first threshold score, and the mortality risk score meets at least a second threshold score, and at least certain business rules are met, generate data describing terms of a life insurance policy. A policy issuance system offers the terms of the life insurance policy to the consumer.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings.

DETAILED DESCRIPTION OF THE EXEMPLARY EMBODIMENTS

Figure 1:
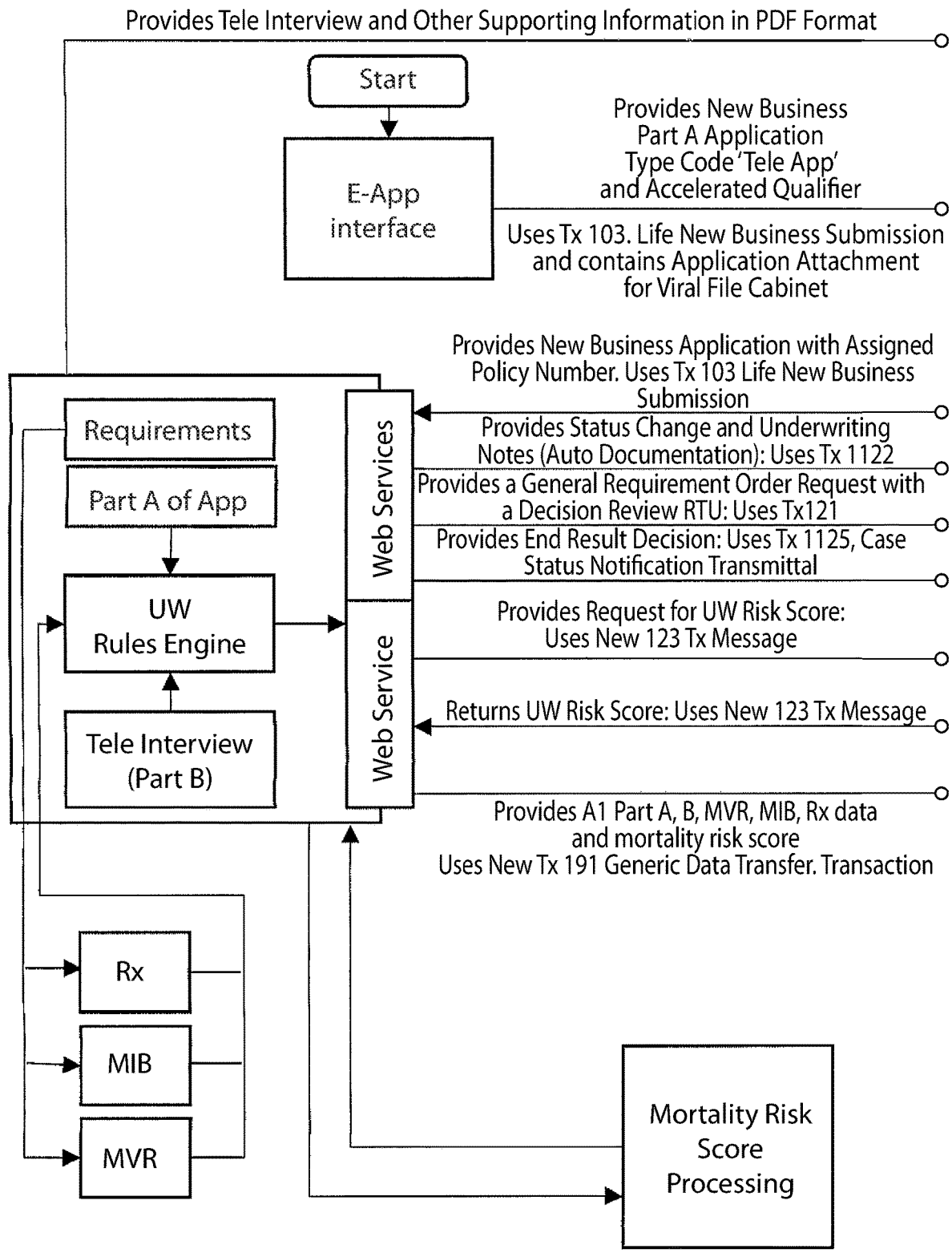
FIG. 1 illustrates an exemplary process, and associated computer components, for carrying out embodiments of the present invention.

The present invention involves a computer system that implements a predictive modeling technique. In the described exemplary embodiment, the model makes predictions about insureds under a life insurance policy. This results in reduced underwriting costs and cycle time for qualifying applicants. Expediting the underwriting processes decreases the turn-around time (from application to policy issuance) and increases the serviceability of the insurer. Generally, the system analyzes data gathered from a variety of sources and processes that data to identify the applicants who qualify for the expedited process. Embodiments of the present invention may also result in more accurate underwriting. More particularly, by developing models that consider many (e.g., thousands) of prior underwriting decision, there is a reduced chance of human bias and/or error which would produce inconsistent future underwriting decisions.

In one embodiment, the system processes the applicant data using at least one statistical model, which may be constructed using machine learning algorithms. Scores are generated that are predictive of risk associated with the applicant. Those individuals with scores exceeding a defined threshold (in combination or individually) may qualify for expedited underwriting and policy issuance. Those applicants not qualifying for the expedited underwriting may be directed through a follow up procedure (manual or automated) or through an alternative underwriting approach used for applicants not subject to expedited underwriting, through which additional applicant data is obtained.

The mortality risk score is derived from applicant data such as, but not limited to age, gender, state of residence, credit debt & loans, bankruptcies, employment, credit report, civil judgments, criminal history, and net worth data in measuring the applicant's mortality risk based on non-medical input data. A machine-learning constructed model analyzes other applicant data such as, but not limited to, data provided in/from the insurance application and any digital, virtual, or telephonic medical interview of the applicant, as well as the applicant's medical history, prescription drug history, and motor vehicle history. While various embodiments described herein involve the use of a tele-interview, further embodiments utilizing digital and virtual, including virtual reality, interfaces for completion of the medical interview are contemplated, wherein the data and scores derived therefrom and the processing of the same correlate with those of the tele-interview as described herein. Embodiments of the present invention thus involve compilation and storage of data from many sources. The increased accuracy of the process results from using two different types of processing, and that the processing is capturing risk by using different data to predict different target variables. The model is used to predict the underwriting decision based on mostly medical data points disclosed on the application, while the other processing predicts mortality based on a set of publically available data.

The machine learning model may utilize support vector machine, or, in another embodiment, an ensemble learning method, such as, but not limited to, random decision forests; gradient boosting modeling techniques and ensemble models that combine different modeling techniques also may be utilized. Through the use of these modeling techniques, the system is more effective at predicting whether an applicant presents certain risks, and is able to reduce underwriting costs and cycle time by eliminating the need for lab work and other traditional underwriting requirements, such as the Attending Physician Statement (APS), for some applicants, and by gathering better applicant data at the onset of the application which reduces attending physician statement orders and eliminates the need for additional applicant interviews.

The embodiments of the present invention comprise or are enabled through a computer-implemented administrative and/or processing system that may be executed in a client/server environment, cloud based environment, mobile device, etc., having hardware and software components. Such systems and devices may utilize any native application languages, any artificial intelligence languages, any communication and processing language, machine-to-machine protocols, and/or other operation, communication, and processing techniques. Database server(s) may include a database services management application that manages storage and retrieval of data from the database(s) or data repositories. The databases may be relational or unstructured databases; however, other data organizational structures may be used without departing from the scope of the present invention.

Thus, in embodiments of the present invention, database(s)/data repositories maintained by the systems of the provider transacting as described herein (e.g., the insurance company) can be used for storing data describing the insurance or financial instruments described herein, and associated accounts. Such information may be stored as part of a record for an applicant.

Reviewing an exemplary embodiment of the inventive process in more detail, an agent may submit an electronic life insurance application on behalf of a consumer. Then, a telephonic or digital interview may be conducted with the consumer to ask a series of medical questions. A predictive model is used to analyze the data from the application and interview, and output a score. Depending on the score, an assessment may be made as to whether there is a high probability of the applicant being low risk, in which case no additional information (e.g., lab work) is needed. Otherwise, additional information (e.g., that is provided by lab work) is needed to assist in making a decision.

With reference to FIG. 1, an exemplary embodiment of the process and associated computer architecture is illustrated. Via electronic application interface 101 (e.g., electronic life insurance policy application processing apparatus), in step 111, a first part of an application (e.g., Part A), with a new application type code (e.g., "Tele App") and an indication that the consumer has agreed to, and the application qualifies for, completion of the remainder of the application via a telephonic interview, is provided to the systems of an insurance company associated with New Business. In step 112, the new application is assigned a policy number and is submitted via Web Services to underwriting desktop 105. In step 113, certain reports are obtained in accordance with underwriting requirements, e.g., a Motor Vehicle Report (MVR) from the state in which the policy is submitted, a report from the Medical Information Bureau (MIB), and a Prescription Drug History (RX). In step 114, a telephonic interview is conducted to secure the remaining information (Part B of the application) necessary to complete the application. In step 115, the data from Part A and Part B of the application is submitted to the underwriting rules engine 102. In step 116, the document containing the data from the telephonic interview, plus other supporting documentation, e.g., obtained from third party database sources, are saved in electronic file storage 107 (also referred to herein as a virtual file cabinet), preferably in PDF format. In step 117, a request is made for the underwriting risk score. In step 118, the data from Part A and Part B of the application is transmitted to the underwriting risk model scoring engine 103 (i.e., a proprietary predictive model) for processing. The details of this processing are described with reference to FIG. 3. In step 119, the underwriting risk model scoring engine 103 returns a risk score. In step 1110, additional data may be pulled and is processed using processor 104 to determine a mortality risk score. In step 1111, the data collected from Part A and Part B of the application, along with the mortality risk score generated using processor 104, is returned. In step 1112, this data is submitted via Web Services to underwriting desktop 105. Note that the underwriting desk top 105 may receive the requirements at different times. Such data is stored in database 106. Based on all of the collected data and accompanying scores, the underwriting desktop 105 sends the consumer status information, i.e., informing the consumer his rate and offered policy terms, or whether additional lab work is required. In a preferred embodiment, such information is sent to the producer for conveying to the consumer, rather than to the consumer directly from the insurance company.

Figures 1, 2:
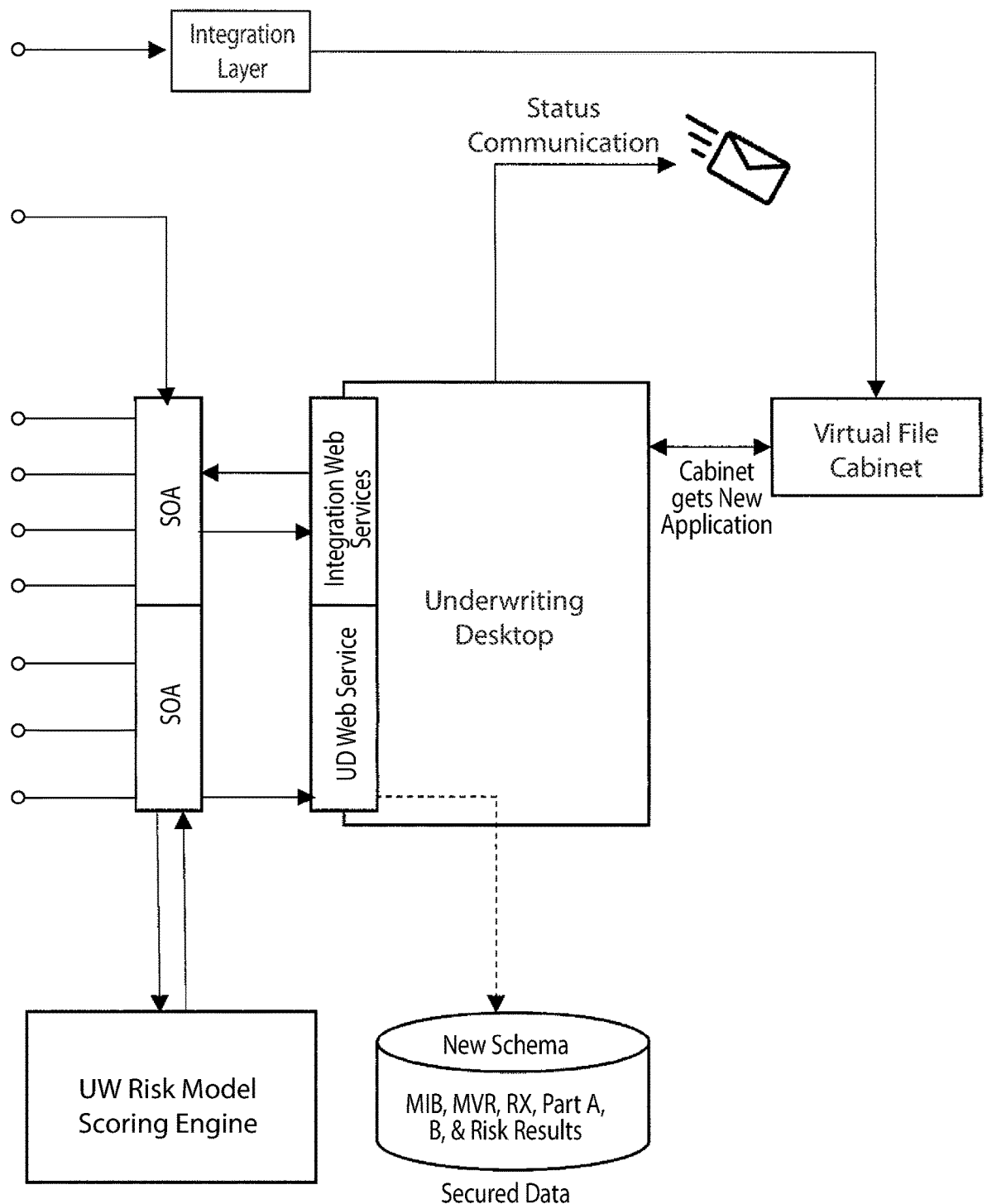
FIG. 2 illustrates an exemplary process, and associated computer components, for carrying out embodiments of the present invention.
Figure 2:
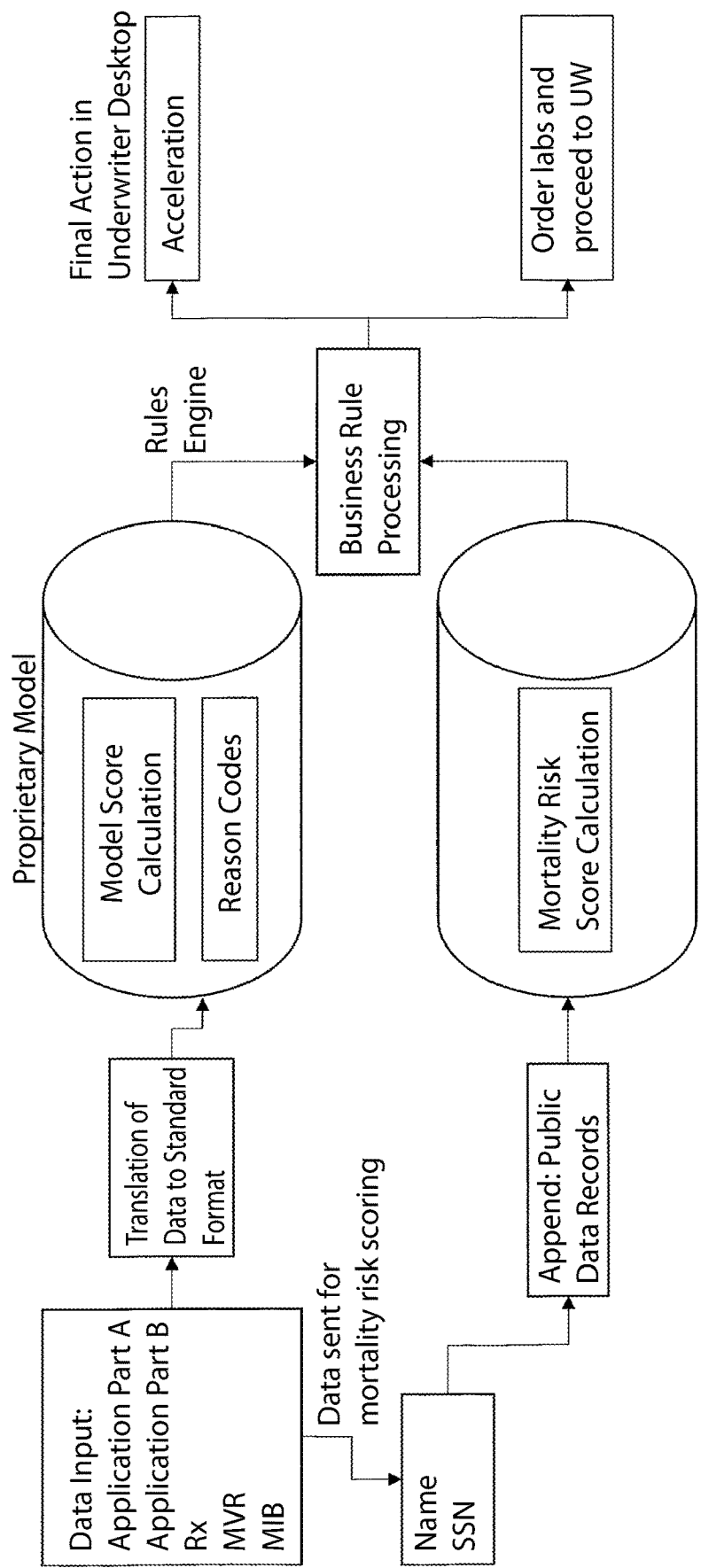

With reference to FIG. 2, the input to the mortality-risk based processor 104 includes data included in Parts A and B of the application (e.g., through an electronic application and a tele-interview as described with reference to FIG. 1), as well as data from RX, MVR and MIB reports for a given consumer. The social security number obtained in this step is used to search public data records for information pertaining to the consumer (e.g., credit score, driving records). This data is processed using processor 104. The other data, i.e., that obtained via Parts A and B of the application, is translated to a standard format. After translation, this data is inputted into the underwriting risk model scoring engine 103, which executes the model that predicts risk across a known spectrum. For instance, while any number of risk levels may be defined across a spectrum, the underwriting risk model scoring engine 103 may predict whether a case falls within any of the following risk levels: Preferred Plus Non-Tobacco, Preferred Non-Tobacco, Preferred Tobacco, Standard Non-Tobacco, Standard Tobacco, Rated Non-Tobacco, Rated Tobacco, and Decline. In one embodiment, the underwriting risk model scoring engine 103 executes the model to predict if the case will be preferred or not (i.e., the score can be interpreted as the percent chance of being preferred). A score is calculated. The data output from model 103 and mortality-risk based processor 104 is then processed using business rules processing engine 108. These business rules provide for an additional risk screen on top of the model and other processing. Thus, the present invention allows for combining a model with mortality risk based processing with a series of rules to segment low and high risk applicants. The rules flag certain high risk cases (e.g., high blood pressure, high cholesterol) for full underwriting, regardless of their score. The output of the business rules engine 108 indicates whether the consumer qualifies for accelerated underwriting (in which a rate and policy terms may be provided to the consumer) or whether additional underwriting is required, in which case the consumer will need to have lab work performed.

Figures 1, 3:
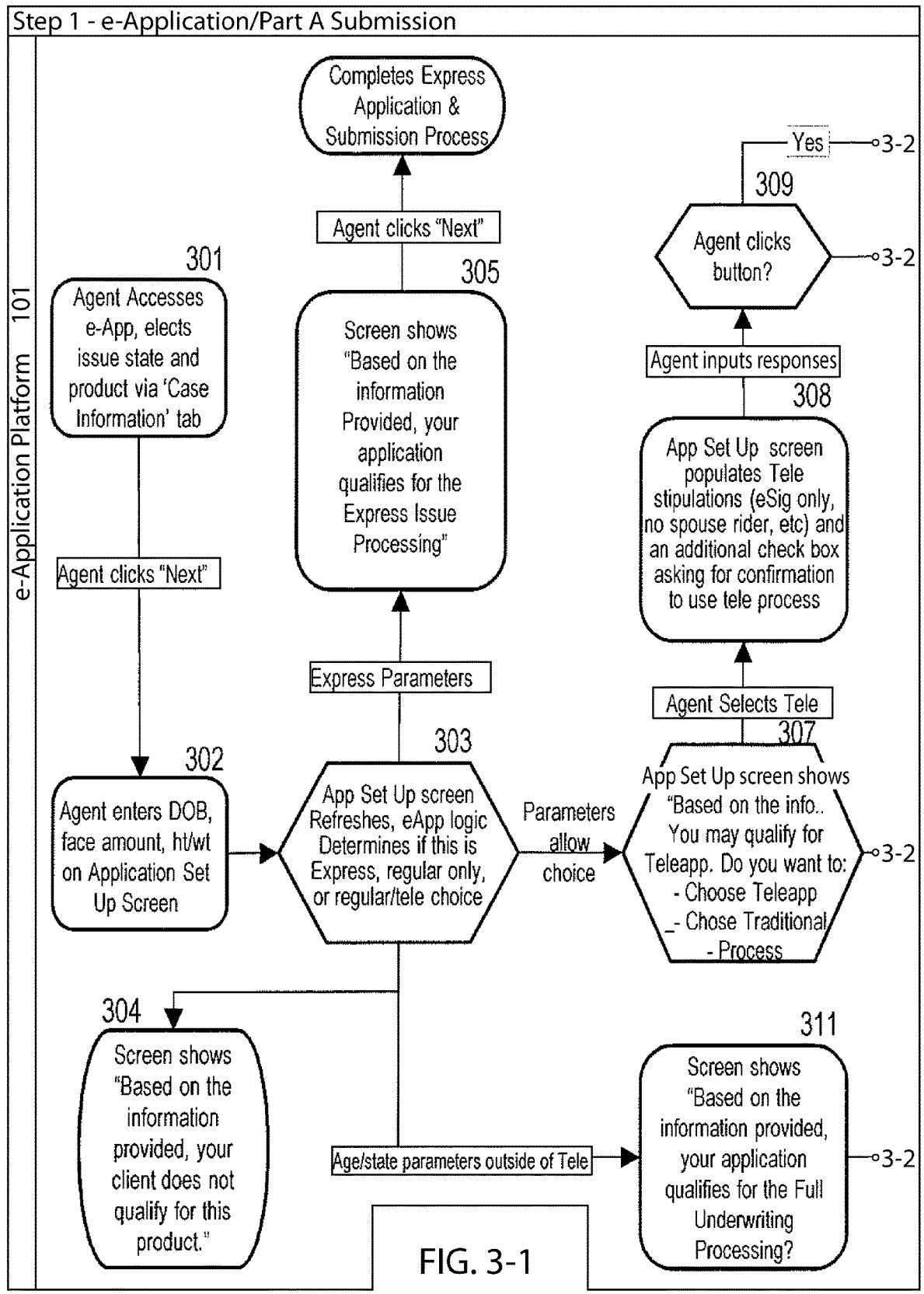
FIG. 3 illustrates an exemplary process, and associated computer components, for carrying out embodiments of the present invention.
Figures 2, 3:
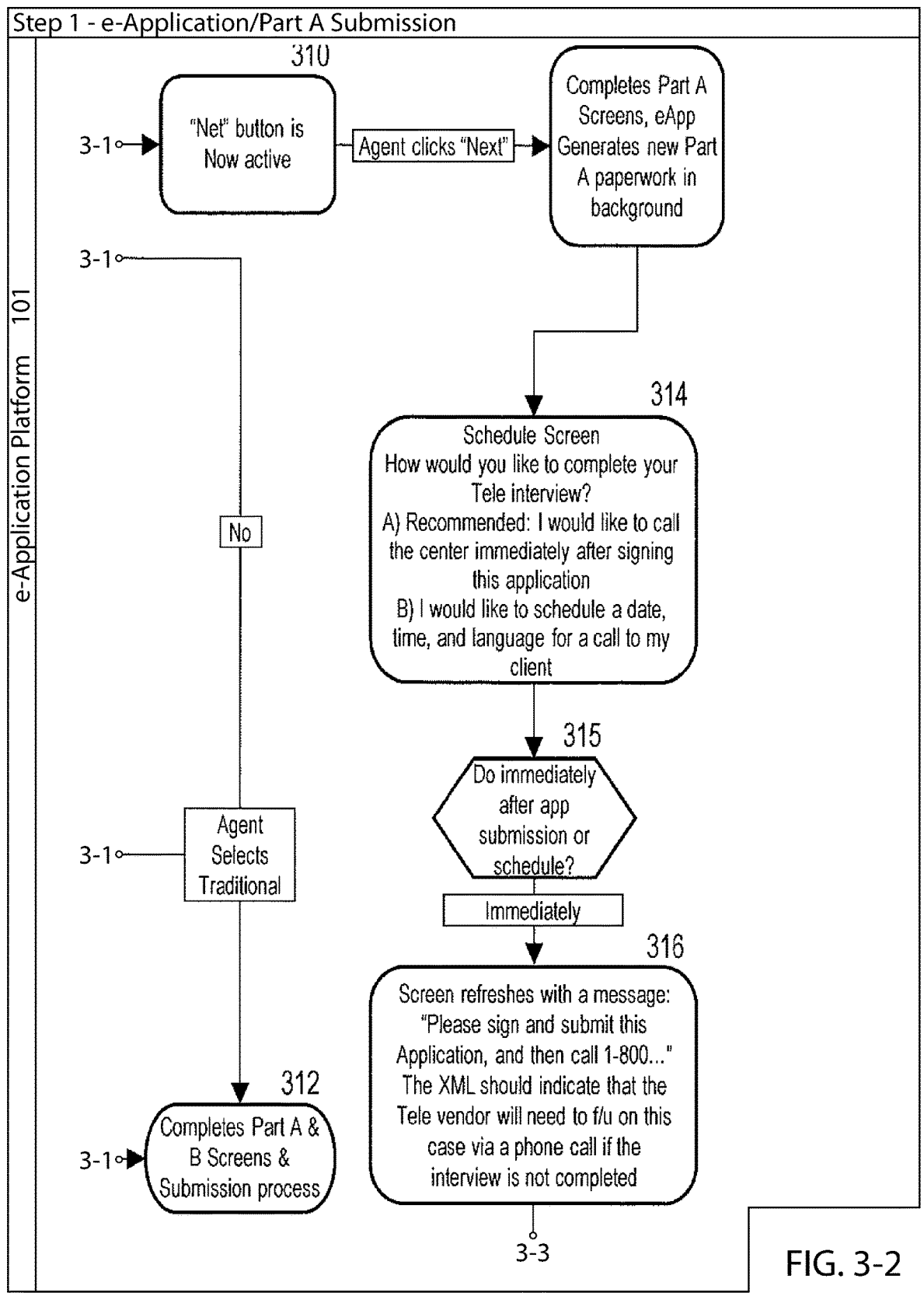
Figure 3:
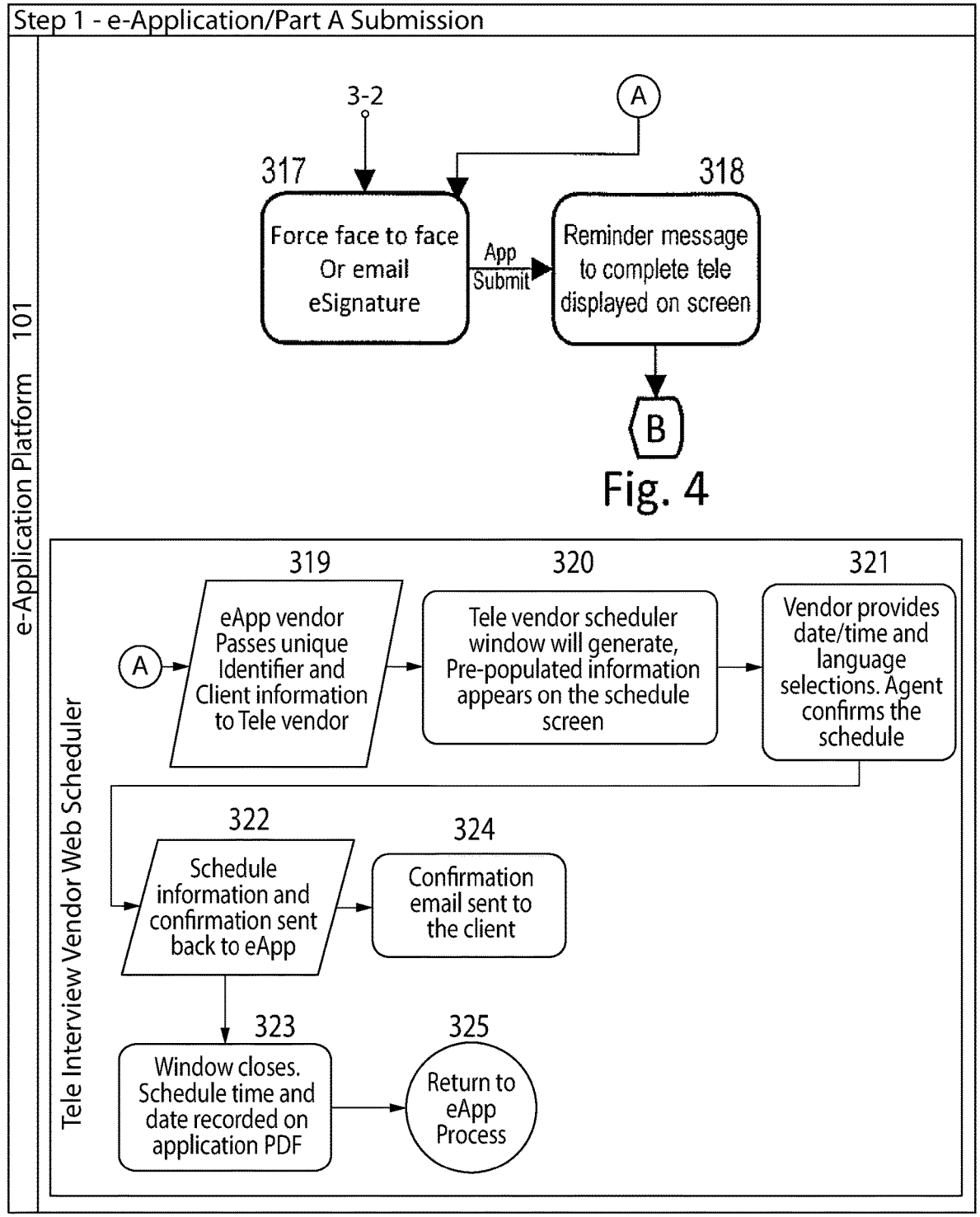

With reference to FIG. 3, the electronic application/Part A submission portion of the process is illustrated in greater detail. In step 301, an agent accesses the electronic application process, and selects the issuance state and product type. In step 302, the agent enters the date of birth, face amount of the policy desired, and height/weight of the consumer in the application set up screen. In step 303, the application set up screen refreshes and the logic determines, based on the information input to date, if the application is suitable for completing the application via telephonic interview, should be processed through the traditional channel, or whether the consumer has an option to choose for the application to be subject to a telephonic interview, or proceed through the traditional channel. In some instances, in step 304, if the parameters are invalid, a screen will be displayed to the agent indicating that the consumer does not qualify for the life insurance product. In other instances, the data will indicate that accelerated underwriting is available. In this instance, in step 305, the screen will display a message indicating that the application qualifies for accelerated/express issue processing. In step 306, the agent completes the express application and submission process. If in step 303 the parameters indicate that there is a choice, in step 307, the screen will display a message indicating that the consumer may qualify for the tele-application process. Here, the consumer may indicate he wants to proceed with the tele-application process or a traditional process. If the consumer selects the tradition process, Parts A and B of the application are completed in the traditional way and submitted, in step 312. If the consumer indicates his desire to proceed with the tele-application process, in step 308, the application set up screen populates the tele-application process stipulations (e.g., only eSignatures will be accepted, certain riders may not be available, etc.) and an additional check box asking for confirmation that the consumer wishes to use the tele-application process is checked. In step 309, the agent asks the consumer questions, inputs responses into the electronic application on behalf of the consumer and, upon completion, clicks the button to complete the process. If the agent does not click the button, the process proceeds to a traditional process in step 312. If the agent clicks the button in step 309, the "next" button on the screen is made available to the agent in step 310. Upon clicking the "next" button, in step 313, the agent submits the information required by the screens representing Part A of the application, and the electronic application generates new Part A paperwork in the background. In step 314, a screen is displayed indicating a question to the consumer regarding how he would like to complete his tele-interview—e.g., call the center immediately after signing the application or schedule a date, time, and language for a call to the consumer to complete the application. In step 315, the consumer's choice is reviewed. If the consumer chooses to complete the tele-interview immediately, in step 316, the screen refreshes with a message indicating that the form should be signed and submitted, and then the agent should call that results in routing the consumer to a medical professional to conduct the interview. A signature is then obtained in step 317 (eSignature or face-to-face). The application is then submitted and, in step 318, a reminder message is displayed to complete Part B of the application.

If the consumer decides in step 315 to schedule the tele-interview later, the process moves to a sub-process to allow for scheduling the tele-interview. Here, in step 319, the electronic-application provider passes a unique identifier and consumer information to the provider performing the telephonic interview services. In step 320, the scheduler window is generated and pre-populated information appears on the schedule screen. In step 321, the provider of the telephonic interview services provides date/time and language information for the consumer and the agent confirms the schedule. In step 322, the schedule information and confirmation are sent back to the service supporting the electronic application process. In step 324, an email confirmation of the scheduled telephonic interview is sent to the consumer. In step 323, the window closes and the schedule time/date is recorded on the PDF version of the application. In step 325, the process returns to the electronic application process (i.e., step 317).

In still further instances, in step 303, the parameters indicate that the tele-application process is not available. In this instance, the screen displays a message indicating that the application does not qualify for the tele-application process and Parts A and B of the application are completed in the traditional way and submitted, in step 312.

Figures 1, 4:
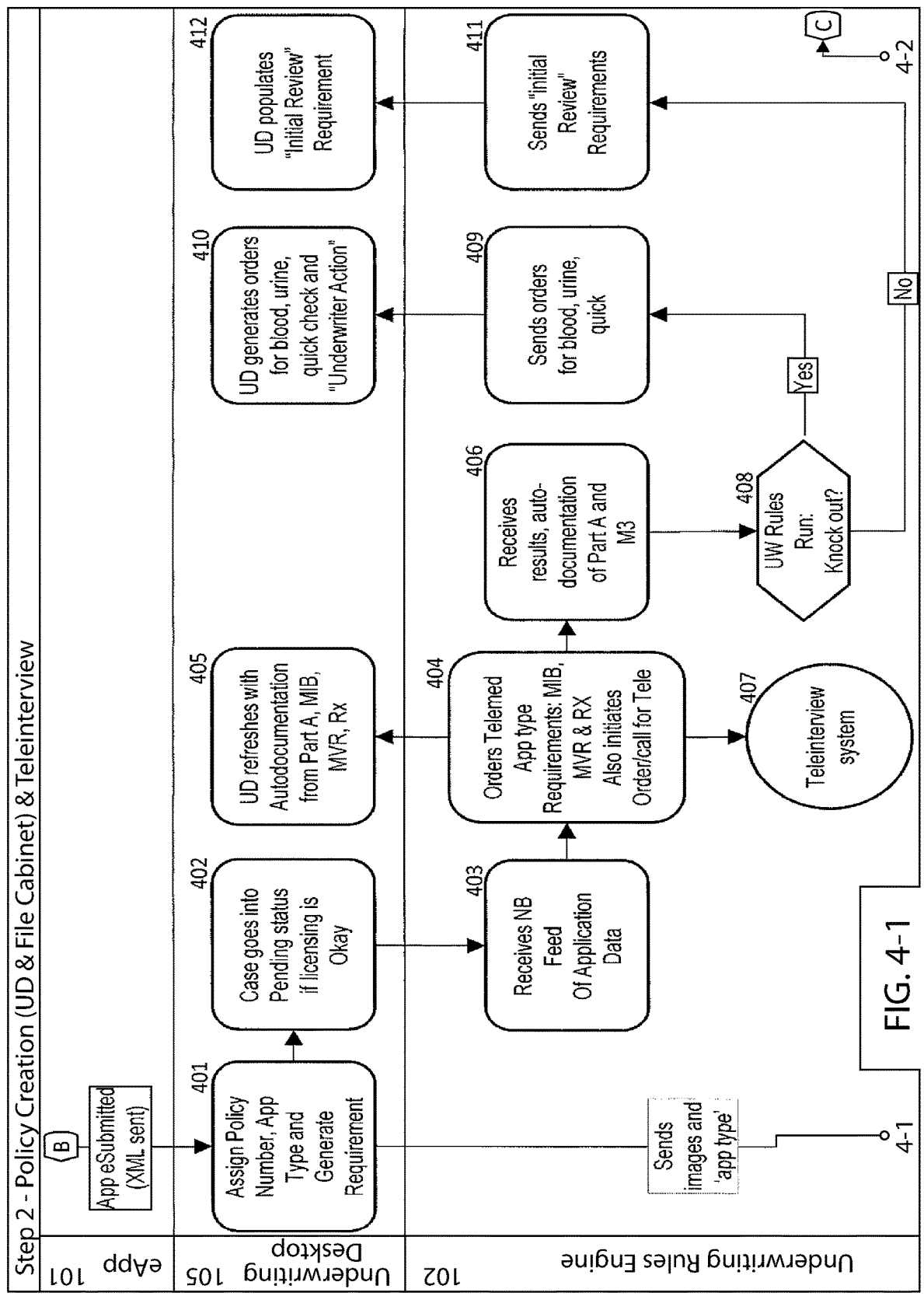
FIG. 4 illustrates an exemplary process, and associated computer components, for carrying out embodiments of the present invention.
Figures 2, 4:
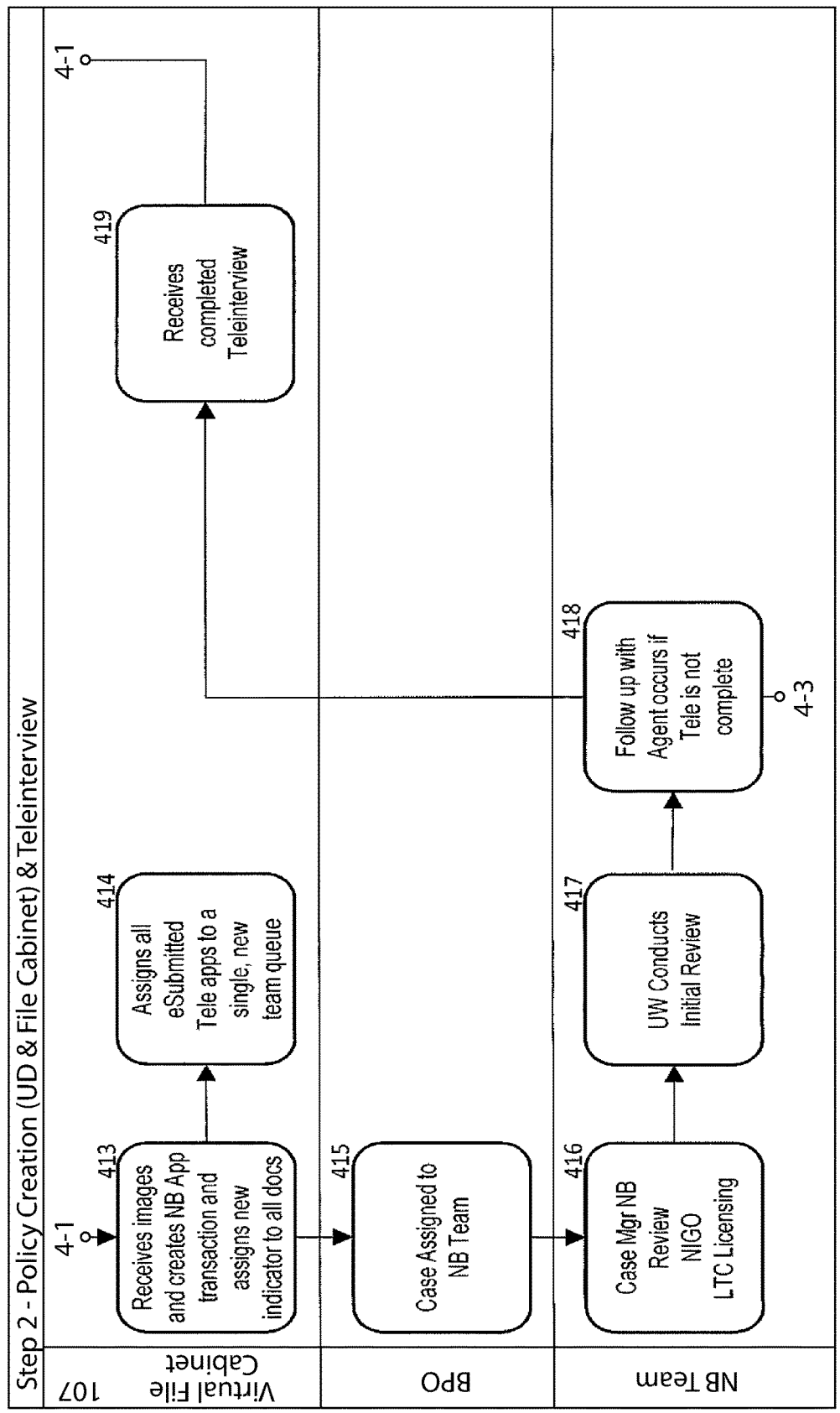
Figures 3, 4:
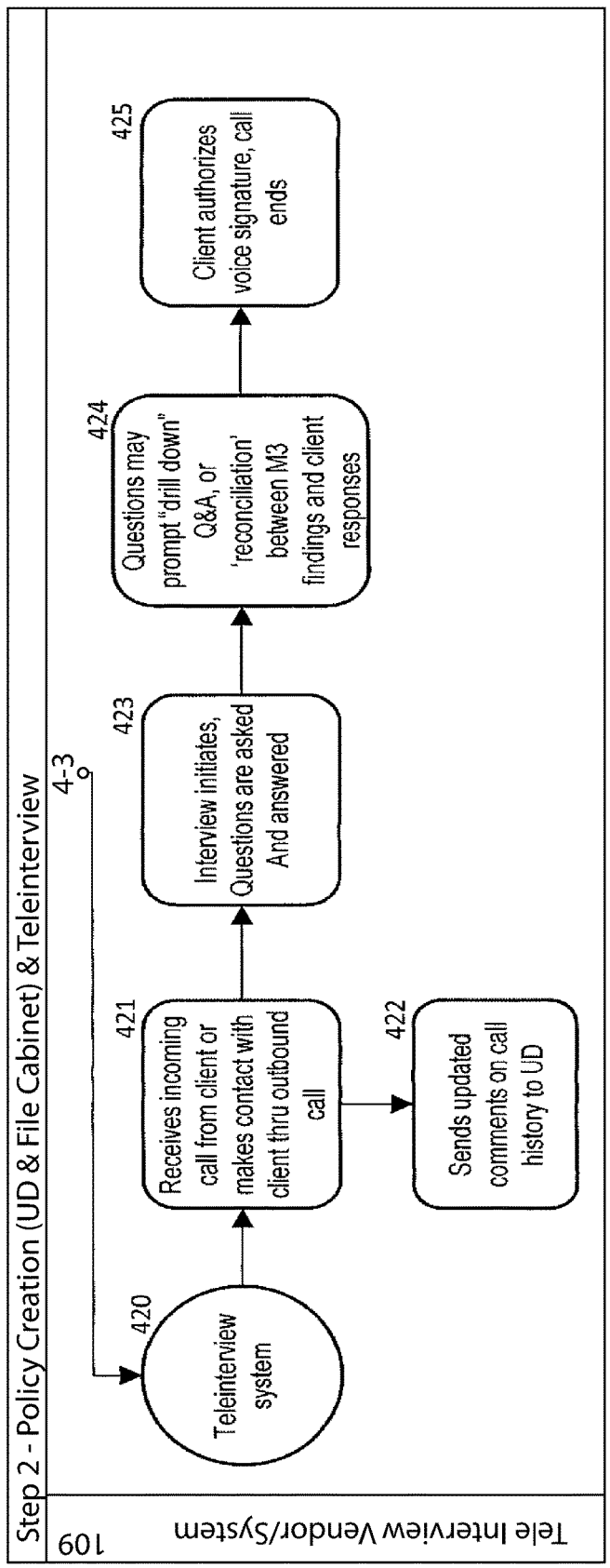

Referring now to FIG. 4, the data collected from the electronic application process described with reference to FIG. 3 is then submitted to the underwriting desktop 105. In step 401, the policy number and application type are assigned, and requirements for the policy are generated (i.e., based on the age and face of the policy, the list of underwriting requirements for the application is generated). In step 402, the case is assigned a pending status, assuming the agent/advisor is properly licensed to sell the applicable products. In step 403, the underwriting rules engine 102 receives a new business feed of application data. In step 404, requirements for this type of application (e.g., RX, MIB and MVR) are ordered and a call to the tele-interview system 407 is made. In step 405, the underwriting desktop 105 refreshes with auto-documentation from Part A of the application, MIB, MVR and RX. In step 406, the results of Part B of the application from the tele-interview are received, as well as documentation of Part A application, MIB, MVR and RX. In step 408, the underwriting rules for the insurance company are run against the data. If, based on this data, the consumer is not eligible for accelerated underwriting, the process moves to step 409, in which orders for lab work are sent to the underwriting desktop 105. In step 410, the underwriting desktop generates the orders for the lab work and indicates the need for underwriter action. If, based on the data, it is determined that the consumer is eligible for accelerated underwriting in step 408, in step 411, the underwriting rules engine 102 sends an initial review requirement to the underwriting desktop 105 and, in step 412, the underwriting desktop 105 populates the initial review requirement (i.e., to determine if all the requirements for input data are present).

Referring back to step 401, after a policy number is assigned, in step 413, the virtual file cabinet 107 receives images, creates a new business application transaction and assigns a new indicator to the associated documentation. In step 414, the electronically submitted tele-application is assigned to a queue for processing. In step 415, the case is assigned to a new business team for processing. In step 416, the new business case manager looks at the case and checks that requirements are met, the case is in good order (i.e., no missed data points) and that the agent is licensed to sell the particular product. In step 417, underwriting performs initial review. In step 418, follow up is conducted with an agent if the tele-application is not complete. In step 419, the completed tele-application is saved in the virtual file cabinet 107. In step 420, a call is made to the tele-interview system 109 (e.g., tele-interview processing apparatus) by the new business team (i.e., to start the phone interview with the applicant to complete Part B of the application). Contact is made with the consumer in step 421 (via an incoming call or outbound call). In step 422, updated comments obtained during the call are sent to the underwriting desktop 105. In step 423, the interview is initiated—questions are asked and answered. In step 424, certain answers to questions may require follow up questions and/or reconciliation between answers provided by the consumer during the tele-interview and RX, MVR, and MIB. At the completion of the interview, the client authorizes a voice signature and the call ends at step 425. As before, a copy of the completed interview responses is saved in virtual file cabinet 107, in step 419. At this point the process continues, with reference to FIG. 5.

Figures 1, 5:
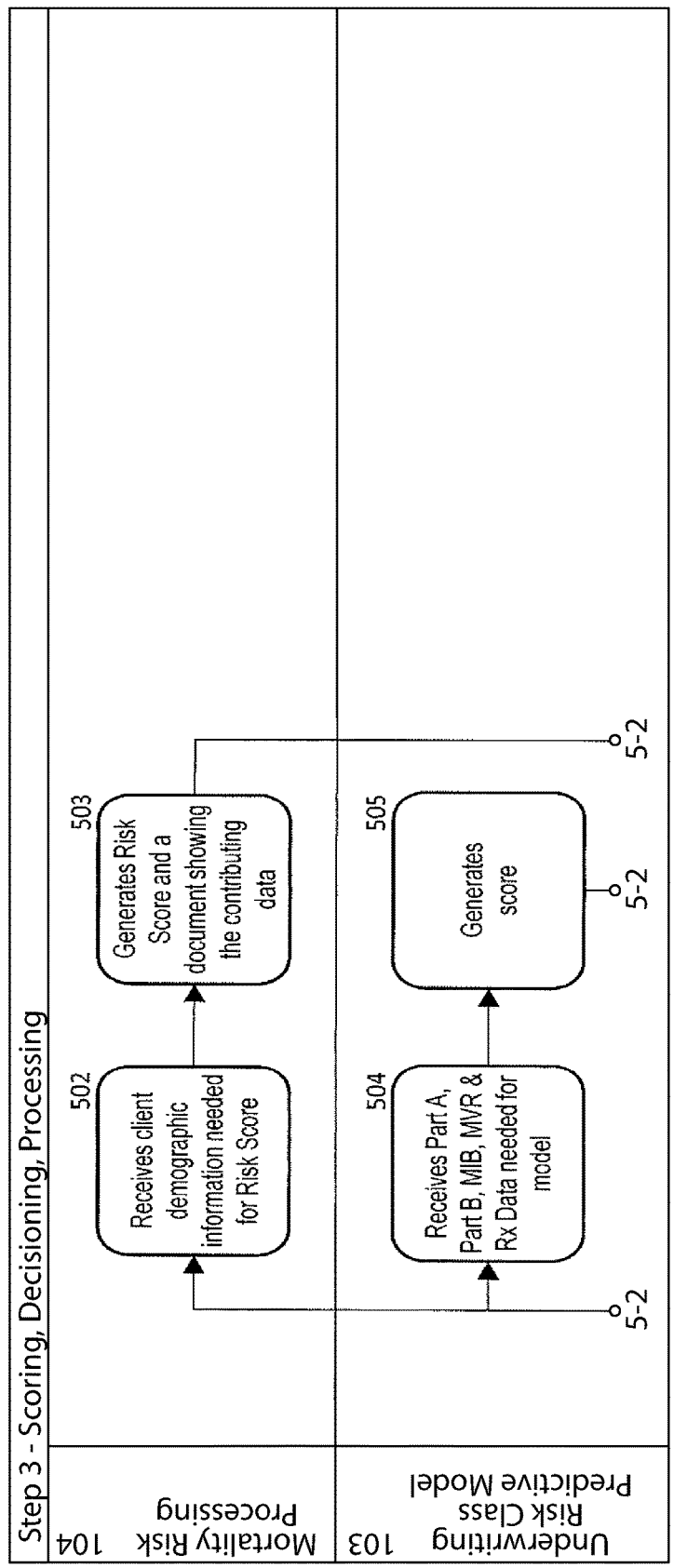
FIG. 5 illustrates an exemplary process, and associated computer components, for carrying out embodiments of the present invention.
Figures 2, 5:
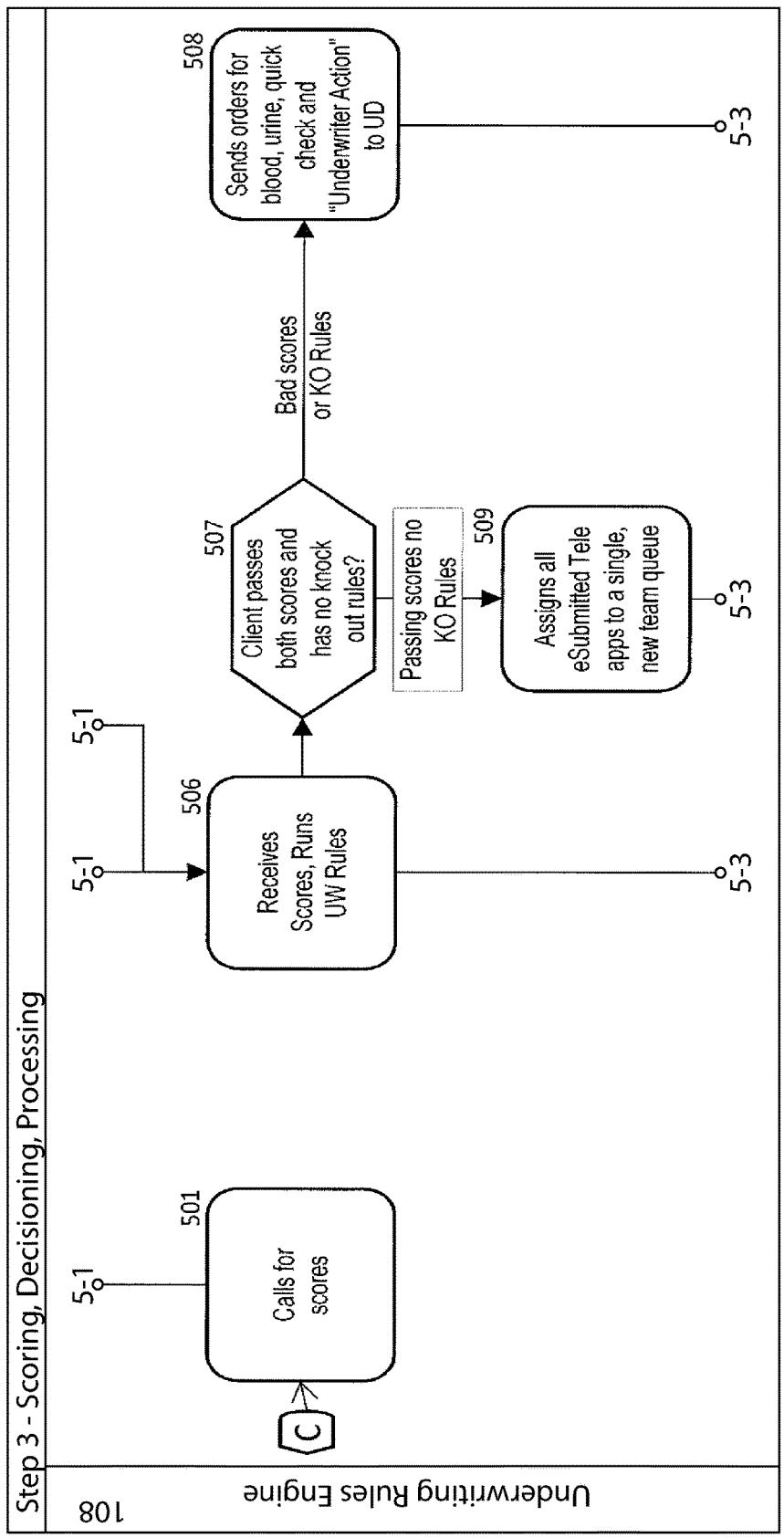
Figures 3, 5:
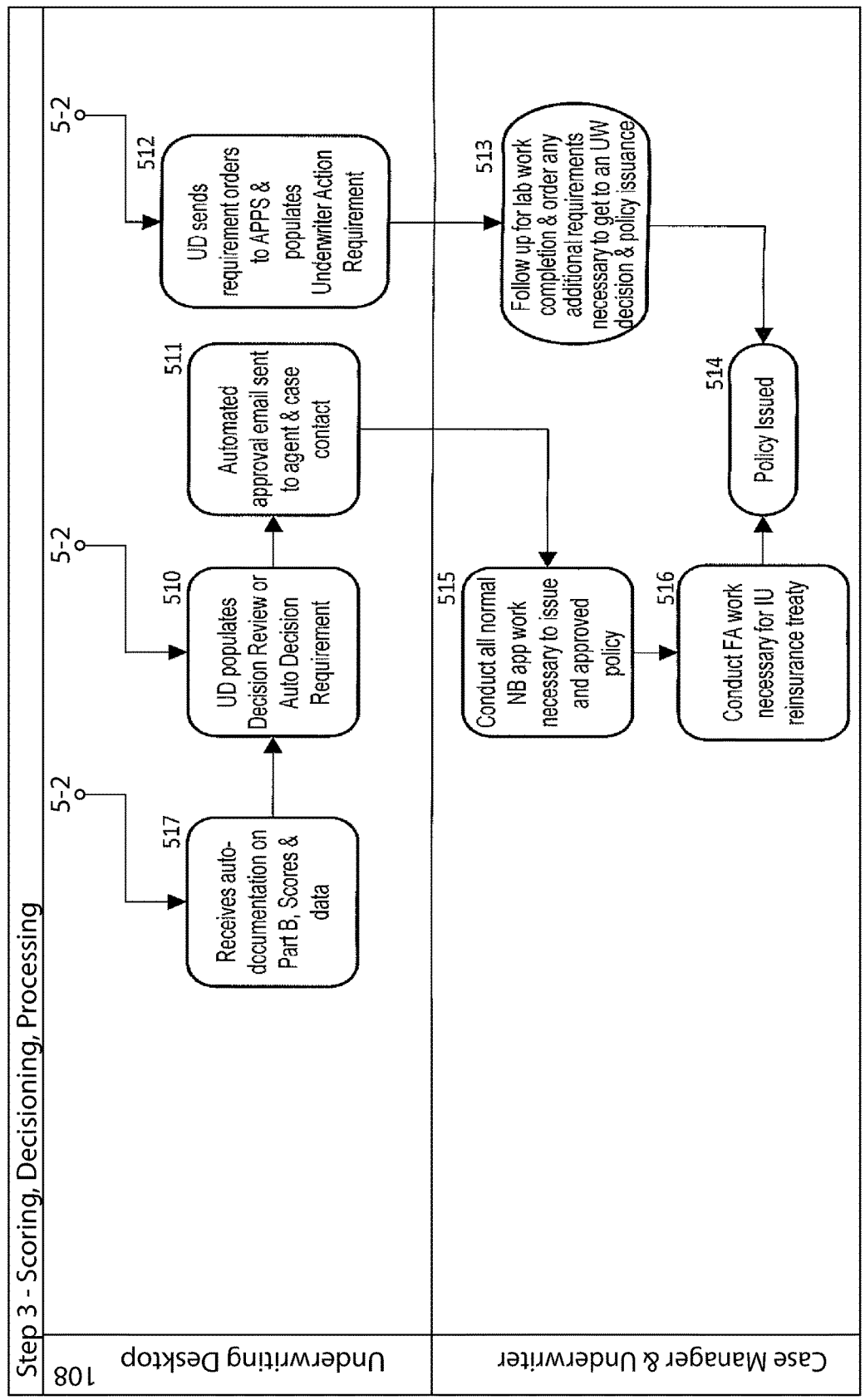

Referring now to FIG. 5, in step 501, calls are made by the underwriting rules engine 108 to secure scores from the underwriting risk model scoring engine 103 and resulting from the mortality-risk processor 104. Underwriting risk model scoring engine 103 receives the data from Parts A and B of the application, as well as RX, MVR and MIB. Demographic information about the consumer is obtained from third party sources. In step 503, a mortality risk score is generated, as well as a document showing the data used in connection with calculating the score. In step 505, underwriting risk model scoring engine 103 generates a score. In step 506, the underwriting rules engine 108 receives the scores and runs underwriting rules. In step 517, the underwriting desktop 105 receives documentation on Part B of the application (Part A having been received previously), the scores and the underlying data relied upon by the model 103 and processor 104 to generate the scores. In step 507, it is determined if both of the consumer's scores are acceptable (e.g., meet a certain minimum threshold) and no knock-out underwriting rules have been triggered. If either the scores are not acceptable or knock-out rules have been triggered, the consumer is not eligible for accelerated underwriting and, in step 508, orders for lab work are sent, as well as a call for underwriter action to the underwriting desktop 105.

In some embodiments, the thresholds to which the scores are compared vary based on the scores (e.g., the higher the score generated by underwriting risk model scoring engine 103, the lower the threshold for the mortality risk score). Further, in another embodiment, the underwriting rules engine 108 utilizes a score-based matrix that evaluates, in unison, the score received from the underwriting risk model scoring engine 103 and score received from the mortality-risk processor 104, in view of the scores' respective minimum thresholds, to make a pass/fail determination of the applicant's eligibility for expedited underwriting, subject to the triggering of the knock-out rules. In another embodiment, the model offers additional paths beyond the binary pass/fail determination that simply either advances the case for accelerated underwriting (step 509) or orders lab work and further underwriting (step 508). The additional paths enable other potential outcomes, enhancing the overall underwriting process. By way of example, in cases where the insurer is highly likely to decline based on the information received, the underwriting rules engine 108 could instruct the insurer's underwriter to decline the case immediately, subject to defined confirmations, saving time and effort for both the applicant and the insurer and avoiding the cost of obtaining lab work and/or an APS. Conversely, there may be a limited group of cases where applicants are likely to be highly rated based on the information received, e.g., Preferred Plus. In these instances, the insurer may make an immediate determination on the applicants' eligibility and offer coverage, rather than spending greater time and resources obtaining additional information.

In step 512, the underwriting desktop 105 sends requirement orders to the system that manages the order of the third party underwriting requirements and populates the underwriter action requirements (i.e., actions that underwriting would be required to follow based on the age and face of the policy, and based on the data regarding the applicant that has been received through Parts A and B of the application). In step 513, lab work follow up is completed, and additional requirements are ordered in order to make an underwriting decision. If the scores meet the required threshold and no knock-out rules are triggered in step 509, the underwriting rules engine 108 sends the auto decision requirement to the underwriting desktop 105. If the conditions are not met, then decision review will occur (i.e., underwriting will review the data and rules and make an underwriting decision). In step 510, the underwriting desktop 105 populates the decision review or auto decision requirement. In step 511, an automated approval email is sent to the agent and case contact. In step 515, typical new business application work necessary to issue the policy as an approved policy is conducted. In step 516, in some embodiments, documentation is generated if required for reinsurance of accelerated underwriting cases. In step 514, the policy is issued by a policy issuance system.

As referenced above, embodiments may process applicant data using statistical models constructed using machine learning algorithms to generate scores predictive of risk associated with the applicant. Machine learning may be a preferred approach where predictive accuracy is paramount. While machine learning models tend to reveal limited insight into relationships between variables, are often very complex (e.g., may contain thousands of trees in a boosted model), and often forego any assumptions or requirements about normality (e.g., well-behaved, bell-shaped data) how variables may interact, such models tend to be helpful in analyzing large datasets. For example, machine learning can be very effective in accurately asserting and assessing assumptions in analyzing a high number of variables, e.g., in one exemplary embodiment over 1300 variables relating to medical conditions and groupings are effectively analyzed.

Other embodiments utilize deep learning or other learning or statistical modeling constructions outside of machine learning. By way of example and not limitation, the following modeling domains may be utilized, independently or in any combination, in accordance with embodiments of the present invention in constructing models to generate scores predictive of risk associated with the applicant: data science, knowledge discovery in databases (KDD), deep learning, data mining, machine learning, artificial intelligence, pattern recognition, neuro computing, data visualization, math and statistics, database technology, substantive domain knowledge.

In one exemplary embodiment, penalized regression models (elastic net) are built through a statistical learning modeling domain and utilized to generate risk-predictive scores. Statistical learning, in contrast with machine learning, focuses on establishing mathematical equations that map to the problem being solved in terms of the input variables by yielding standard coefficients that help provide more explanatory power with respect to the variables. This explanatory power offered through statistical learning may, in some circumstances, come at a trade off in the predictive power generally provided through machine learning. In one embodiment, statistical learning techniques are used in analyzing applicant responses to non-medical condition questions addressing, for example, approximately sixty-five variables for attributes like applicant's age, BMI, work status, tobacco use, specified amount, etc. In exemplary embodiments as such where there are a more limited number of variables analyzed, e.g., only approximately sixty-five variables, the insurer's ability to understand or explain the prophylactic value of the questions presented to the applicant in terms of risk may be more intuitive and easier to understand based on historical data, and can be more easily corroborated via traditional actuarial approaches.

Referring now to details of the underwriting risk model scoring engine 103 more specifically, this proprietary model accepts as its inputs a plurality of variables. The model then returns a score which is approximately representative of the chance of an application being preferred for a life insurance policy. This output is used as one of the three factors to determine if a case should be accelerated for underwriting purposes, as described in detail elsewhere herein (i.e., the applicant must meet the minimum score defined for both models and not have any knock out rules flagged).

Referring now to how this model may receive data required to generate a score, an XML transaction file may be sent to the model for purposes of data input. In this XML transaction file, the same set of lines repeat, with the variable names following the "KeyName=". In this example, this structure allows a number of variables to be passed through. It will be understood by those skilled in the art that other numbers of variables may be used within the scope of the present invention. In other preferred embodiments, however, an undetermined number of variables may be accepted for input, rather than a fixed set of variables, which allows for more flexibility in the model. More particularly, the determination of the number of variables that are passed through the model may vary by applicant, e.g., depending on the number of positive responses to the telephone interview regarding health conditions. Responses received by way of the telephone interview allows for a more expansive list of variables to be taken into consideration during the analysis (e.g., over 1,000 specific health conditions could be evaluated, although far fewer conditions are likely to be relevant to any particular applicant). Allowing for input of this granular level of detail into specific conditions an applicant may have enhances the level of predictiveness of the model. One manner of accomplishing this is to extend the length of the XML file to send the additional data points needed for the model to run. It can be structured such that only the conditions that have been identified will be sent in the XML. It is assumed that each condition is false unless data is received stating that it is true. Thus, only the existing conditions need to be sent, instead of sending over 1000 true/false variables in the XML.

Figure 6:
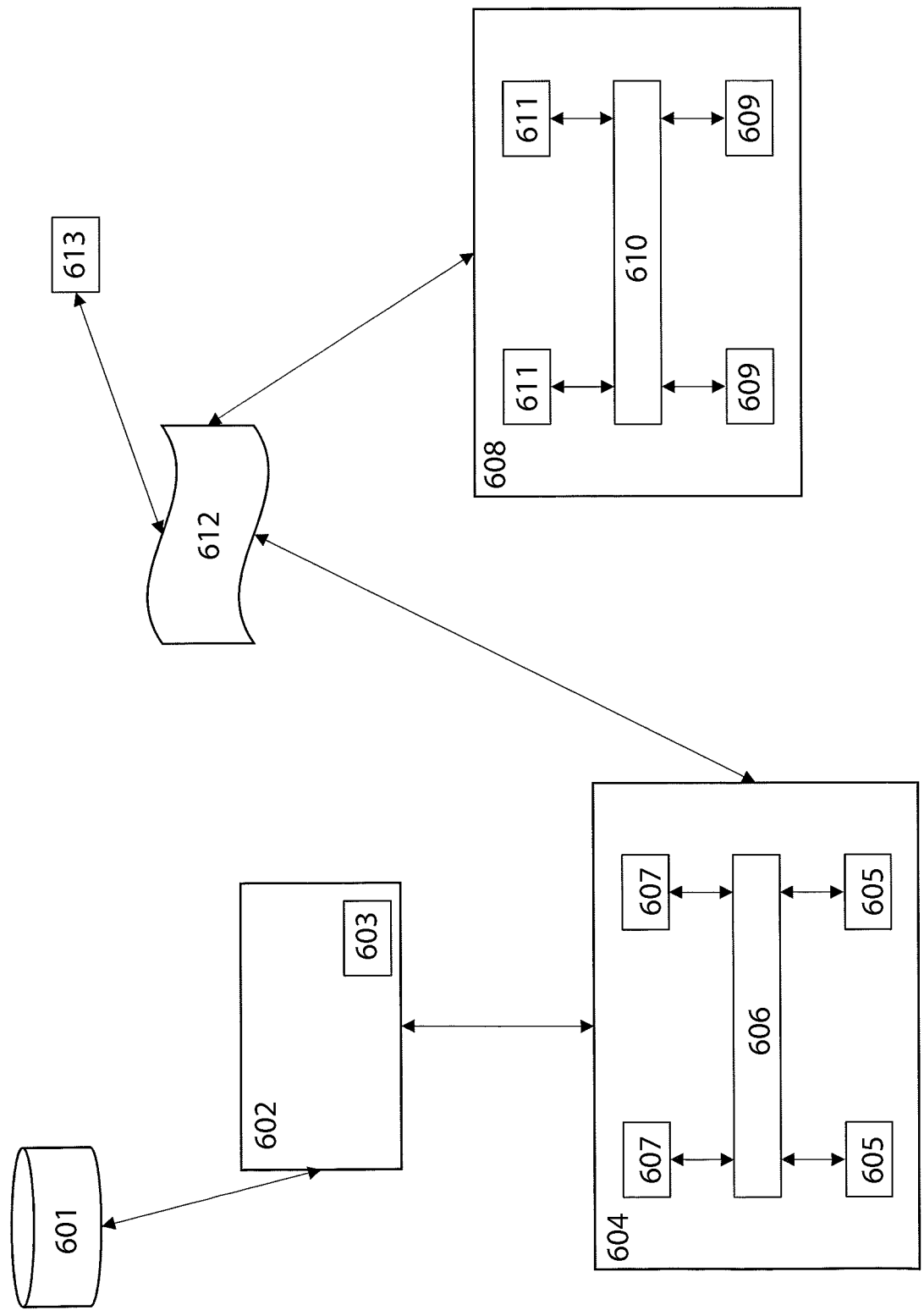
FIG. 6 illustrates an exemplary system for carrying out aspects of the present invention.

In some embodiments, the methods are carried out by a system that employs a client/server architecture such as, for example, the collection of components illustrated and described with reference to FIGS. 1-5. Such exemplary embodiments are described as follows with reference to FIG. 6. The data that may be used as an input to the system, and the outputs from the system, may be stored in one or more databases 601. Database server(s) 602 may include a database services management application 603 that manages storage and retrieval of data from the database(s) 601. The databases 601 may be relational databases; however, other data organizational structure may be used without departing from the scope of the present invention.

One or more application server(s) 604 are in communication with the database server 602. The application server 604 communicates requests for data to the database server 602. The database server 602 retrieves the requested data. The application server 604 may also send data to the database server 602 for storage in the database(s) 601. The application server 604 comprises one or more processors 605, non-transitory computer readable storage media 607 that store programs (computer readable instructions) for execution by the processor(s), and an interface 606 between the processor(s) 605 and computer readable storage media 607. The application server 604 may store the computer programs referred to herein.

To the extent data and information is communicated over a network (e.g., the Internet or an Intranet), one or more network servers 608 may be employed. The network server 608 also comprises one or more processors 609, computer readable storage media 611 that store programs (computer readable instructions) for execution by the processor(s), and an interface 610 between the processor(s) 609 and computer readable storage media 611. The network server 608 is employed to deliver content that can be accessed through the communications network 612, e.g., by an end user employing computing device 613. When data is requested through an application, such as an Internet browser, the network server 608 receives and processes the request. The network server 608 sends the data or application requested along with user interface instructions for displaying a user interface on device 613.

The computers referenced herein are specially programmed to perform the functionality described herein.

The non-transitory computer readable storage media (e.g., 607 or 611) that store the programs (i.e., software modules comprising computer readable instructions) may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system and processed.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A predictive assessment system comprising:
   an application processing apparatus that receives from a first user interface, input data describing a consumer, wherein the application processing apparatus stores the input data in an electronic file storage and assigns a transaction indicator to the input data, the input data being a first format;
   a tele-interview electronic device, that receives first additional data relating to the consumer, the tele-interview electronic device configured to generate a scheduler window on the first user interface and configured to populate on the scheduler window at least some of the input data received from the electronic file storage and some of the first additional data, wherein the tele-interview electronic device stores the first additional data in the electronic file storage and assigns the transaction indicator to the first additional data, the first additional data being in a second format;
   one or more third party data bases that transmit, in response to a request from a processing unit, second additional data relating to the consumer if the consumer is eligible for participation in an automated predictive process, the second additional data being in a third format and obtained from publicly available third-party sources, stored in the electronic file storage, and assigned the transaction indicator;
   the processing unit having program instructions configured to:
      map the input data to the first additional data and the second additional data based on the transaction indicator;
      convert input data describing the consumer from the first format to a fourth format, the first additional data from the second format to the fourth format, and the second additional data from the third format to the fourth format, wherein the first format, the second format, and the third format are different than the fourth format;
      generate, using a predictive model constructed via machine learning trained by analyzing one or more of medical data, insurance data, and motor vehicle history data, a risk score associated with the consumer based on the converted input data and the converted first additional data;
      generate, using the predictive model, a mortality score associated with the consumer based on the converted second additional data;
      determine that the risk score exceeds a first threshold score, and the mortality score exceeds a second threshold score, and automatically generate a prediction assessment, in response to the risk score exceeding the first threshold score and the mortality score exceeding the second threshold score, wherein the prediction assessment includes an indication that the consumer is low risk and eligible to receive an automated insurance policy offer via the automated predictive process without further action from an underwriter, wherein the processing unit utilizes a score-based matrix to determine if the risk score at least meets the first threshold score, and the mortality score at least meets the second threshold score;
   an issuance system that receives, from the processing unit, the prediction assessment, and automatically delivers the automated insurance policy offer based on the prediction assessment, wherein the issuance system causes the automated insurance policy offer to be displayed on a second user interface to indicate completion of the automated underwriting process.

2. The system of claim 1, wherein the risk score and the mortality score are predictive of a risk associated with the consumer.

3. The system of claim 1, wherein the second threshold score is dependent on the risk score.

4. The system of claim 1, wherein the second additional data includes a social security number of the consumer.

5. The system of claim 1, further comprising if at least certain business rules are not met, generating a request for lab work data associated with the consumer.

6. The system of claim 1, further comprising if the risk score does not at least meet the first threshold score, generating a request for consumer lab work data.

7. The system of claim 1, further comprising if the mortality score does not at least meet the second threshold score, generating a request for consumer lab work data.

8. The system of claim 1, wherein the first user interface and the second user interface are the same.

9. The system of claim 1, wherein the scheduler window is populated with at least some of the input data and some of the first additional data based on a unique identifier associated with consumer, the unique identifier being received by the tele-interview electronic device.

10. The system of claim 1, wherein the second threshold score is inversely related to the risk score.

* * * * *